US011451682B2

(12) United States Patent
Yoshiwara

(10) Patent No.: US 11,451,682 B2
(45) Date of Patent: Sep. 20, 2022

(54) SHEET FEEDING APPARATUS, IMAGE READING APPARATUS, AND IMAGE FORMING APPARATUS

(71) Applicant: CANON KABUSHIKI KAISHA, Tokyo (JP)

(72) Inventor: Chiaki Yoshiwara, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/144,497

(22) Filed: Jan. 8, 2021

(65) Prior Publication Data

US 2021/0218854 A1 Jul. 15, 2021

(30) Foreign Application Priority Data

Jan. 15, 2020 (JP) .............................. JP2020-004637

(51) Int. Cl.
*H04N 1/04* (2006.01)
*H04N 1/00* (2006.01)

(52) U.S. Cl.
CPC ..... *H04N 1/00602* (2013.01); *H04N 1/00037* (2013.01); *H04N 1/00615* (2013.01); *H04N 1/00702* (2013.01)

(58) Field of Classification Search
CPC ........... H04N 1/00602; H04N 1/00615; H04N 1/00702
USPC ....................................................... 358/498
See application file for complete search history.

(56) References Cited

U.S. PATENT DOCUMENTS

| 9,927,753 | B2* | 3/2018 | Takahashi .......... G03G 15/6514 |
| 10,124,969 | B2 | 11/2018 | Yoshiwara et al. |
| 10,469,688 | B2 | 11/2019 | Xie et al. |
| 2012/0049442 | A1* | 3/2012 | Sekiguchi ................ B65H 7/02 271/227 |
| 2020/0385226 | A1* | 12/2020 | Hishinuma ........ G03G 15/6567 |
| 2021/0218856 | A1* | 7/2021 | Okawa ............... H04N 1/00687 |

FOREIGN PATENT DOCUMENTS

JP 2005-247482 A 9/2005

* cited by examiner

*Primary Examiner* — Cheukfan Lee
(74) *Attorney, Agent, or Firm* — Venable LLP

(57) ABSTRACT

A document feeding apparatus includes a document tray, a feed roller, a separation conveying unit, a first detecting unit and a control unit. The first detecting unit detects that the document is at the first detecting position when a protrusion amount of a flag member is a first amount and detects that no document is at the first detecting position when the protrusion amount is a second amount. The control unit executes an operation in a first mode in which a first detecting process is executed so as to detect the presence or absence of the document before starting to lower the feed roller and the presence or absence is determined, and in a second mode in which a second detecting process is executed so as to detect the presence or absence at the first detecting position after lowering said feed roller and the presence or absence is determined.

11 Claims, 11 Drawing Sheets

(a)

(b)

(a)

(b)

SHEET FEEDING APPARATUS, IMAGE READING APPARATUS, AND IMAGE FORMING APPARATUS

FIELD OF THE INVENTION AND RELATED ART

The present invention relates to a document feeding apparatus which feeds documents into an image reading apparatus, an image reading apparatus, and an image forming apparatus having an image reading apparatus.

There have been known image forming apparatuses such as a copying machine, a facsimileing machine, etc., which are equipped with an image reading apparatus such as a scanner which obtains data of an image of a document by optically reading the image of the document. Some of these image reading apparatuses are equipped with an automatic document feeding apparatus (Automatic Document Feeder), which hereafter will be referred to as ADF) which can read multiple documents with a single operation. An ADF has a tray in which documents (each of which is in the form of a sheet of paper) are placed in layers. It feeds the documents one by one from the tray into an image reading apparatus with the use of its separating-conveying portion, and conveys each document to the reading portion of the image reading apparatus (Japanese Laid-open Patent Application No. 2005-247482: Patent Document 1). In the case of the ADF disclosed in Patent Document 1, a pair of sensors for detecting the presence of a document is positioned or disposed on the tray, and also, in the adjacencies of the separating-conveying portion, one for one, to detect the presence (or absence) of the document. Feeding of a document is started as the presence of a document in the tray is detected.

In recent years, it has been increasingly desired for an ADF to be able to feed a document of a small size, such as a name card (business card) and a bank check (which hereafter may be referred to as small document), into an image reading apparatus. Sheets of paper tend to adhere to each other due to the presence of static electricity. Further, as one of the stacked document (sheets of paper) is moved out of the stack, friction occurs between the document and the documents which are in contact with the document. Thus, in a case where multiple small documents (sheets of paper) are fed into an ADF, it sometimes occurs, because of the presence of static electricity and/or friction that the document (sheet of paper) which is to be fed next into the ADF remains stuck to the document (sheet of paper) which is to be fed first into the ADF. If the second document (sheet of paper) remains stuck to the first document (sheet of paper) to be fed, it sometimes occurs that the second document (sheet of paper), that is, the document (sheet of paper) which is not to be fed reaches the separating-conveying portion. As the second document (sheet of paper) reaches the separating-feeding portion, it is pinched by the separating-feeding portion. Therefore, the document (sheet of paper) is made to float from the tray. Consequently, whether or not a document (documents) is in the tray is erroneously detected. Therefore, the next document (documents) to be fed fails to be fed, and remains in the tray.

SUMMARY OF THE INVENTION

According to an aspect of the present invention, there is provided a document feeding apparatus comprising: a document tray provided with a document placement surface placing documents; a feed roller, contactable to and separable from a top surface of the documents placed on the document tray, configured to feed the document in a feeding direction by rotating in contact with the top surface of the documents; a separation conveying unit, disposed downstream of said feed roller with respect to the feeding direction, configured to separate and convey the document fed from said feed roller, one by one; a first detecting unit, provided with a flag member movable so as to change a protrusion amount by which said flag member protrudes from the document placement surface at a first detecting position of the document surface overlapped with said feed roller in a widthwise direction perpendicular to the feeding direction, configured to detect that the document is at the first detecting position in a case in which the protrusion amount of said flag member is a first amount and detect that no document is at the first detecting position in a case in which the protrusion amount is a second amount greater than the first amount; and a control unit configured to execute an operation in a first mode in which a first detecting process is executed so as to detect the presence or absence of the document at the first detecting position before starting to lower said feed roller and the presence or absence of the document at the first detecting position is determined, and in a second mode in which a second detecting process is executed so as to detect the presence or absence of the document at the first detecting position after lowering said feed roller and the presence or absence of the document at the first detecting position is determined.

Further features of the present invention will become apparent from the following description of exemplary embodiments (with reference to the attached drawings).

Figure 4:
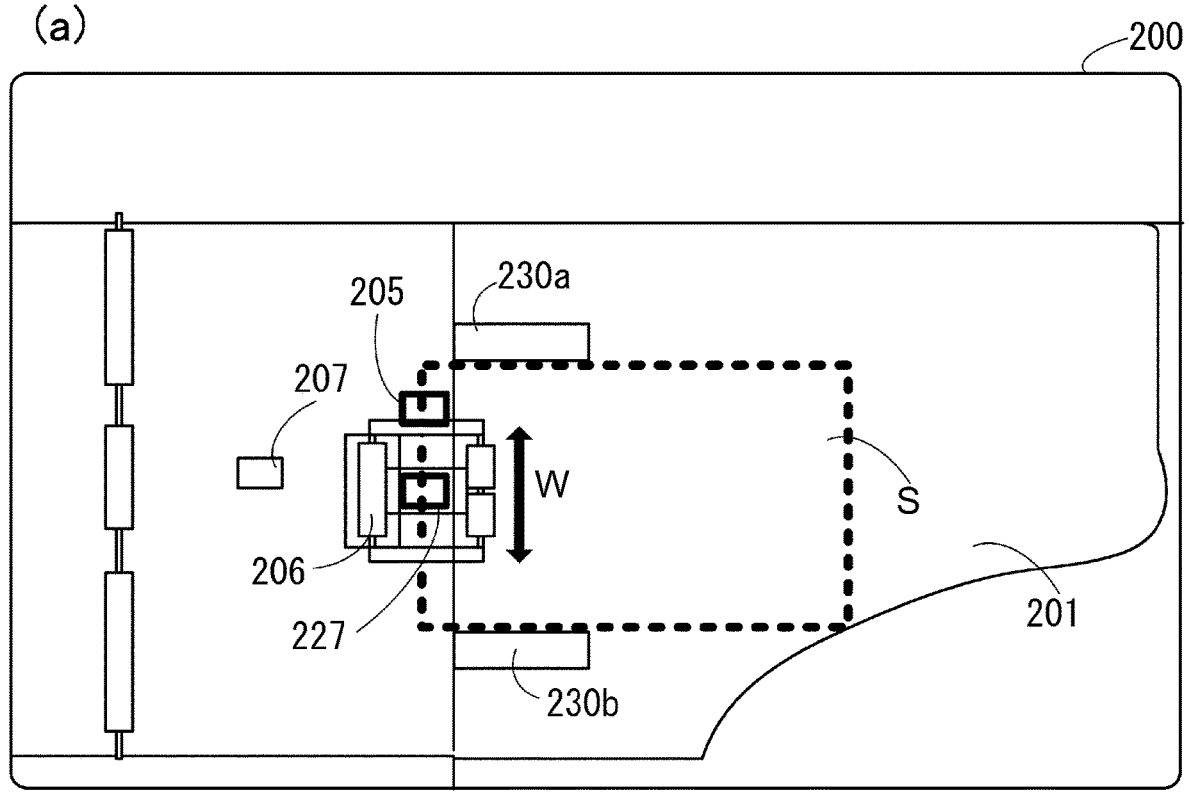
Figure 4:
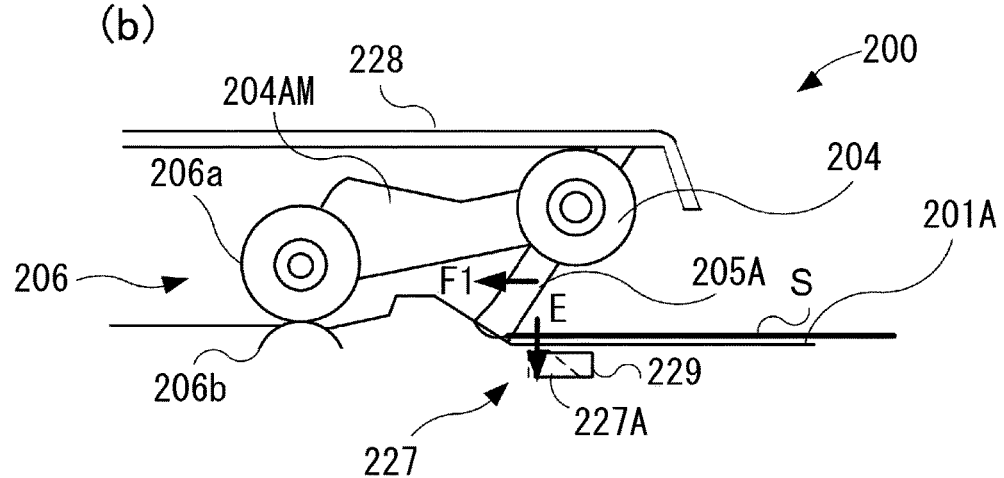

Parts (a) and (b) of FIG. 4 are a combination of top and sectional views, respectively, of the essential portion of the ADF in the first embodiment when a sheet of paper (document) is in the document tray.

Figure 5:
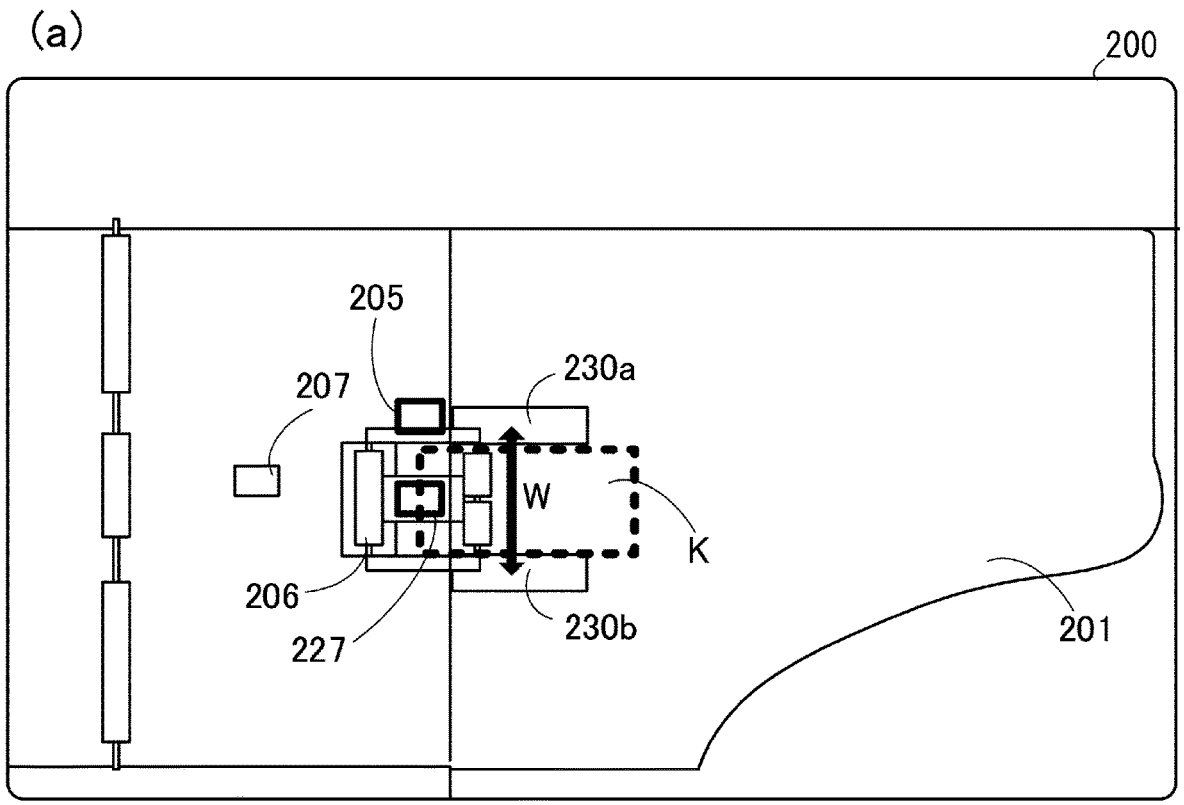
Figure 5:
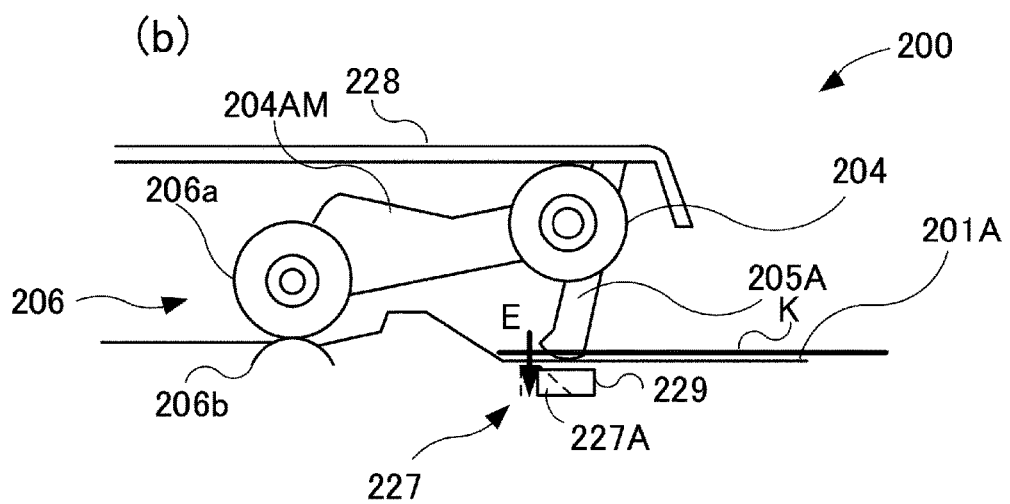

Parts (a) and (b) of FIG. 5 are a combination of a top and sectional views, respectively, of the essential portion of the ADF when a small document (sheet of paper) is in the document tray.

Figure 6:
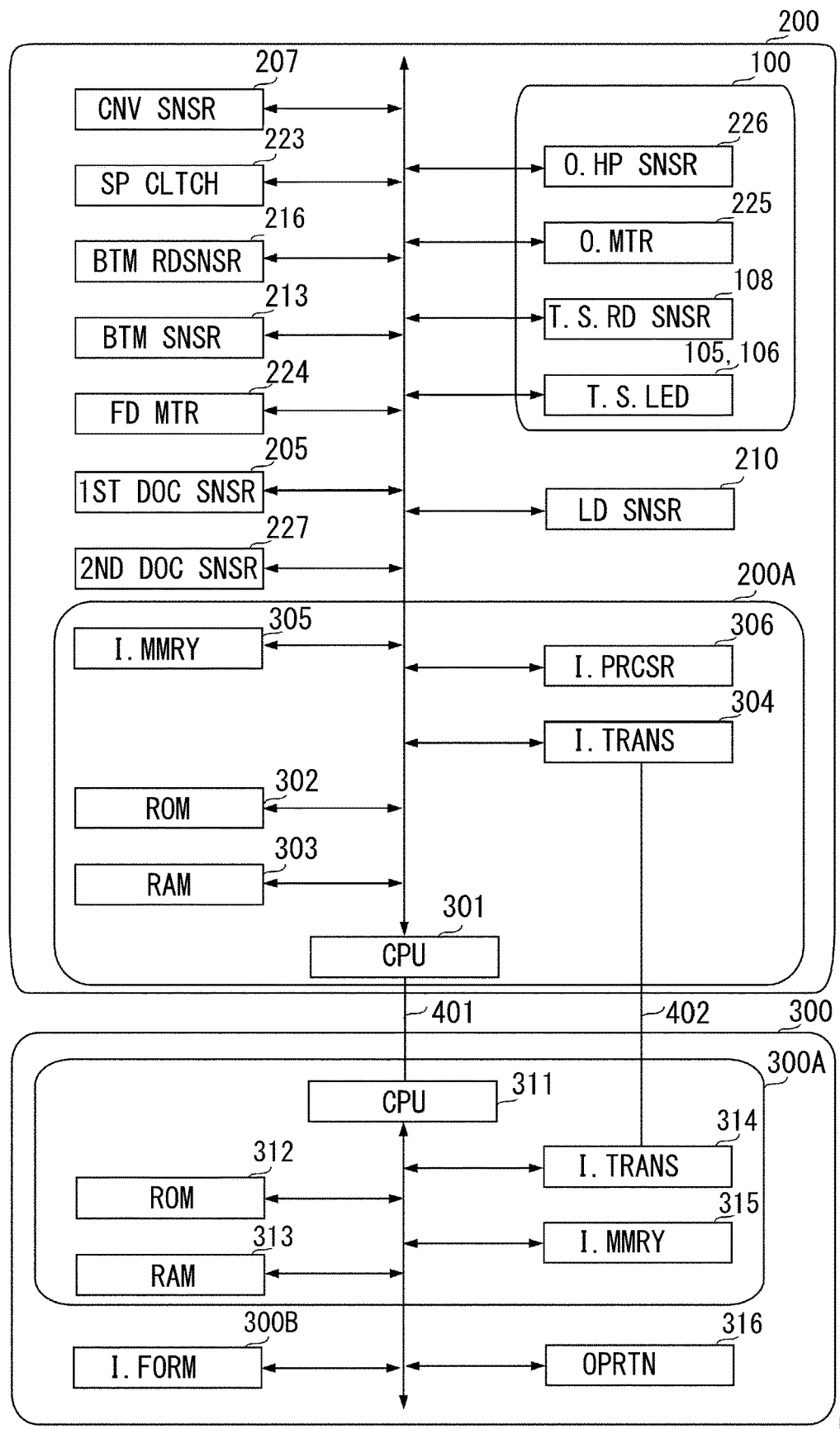

FIG. 6 is a block diagram of the control portion of the image forming apparatus in the first embodiment; it shows the structure of the control portion.

Figure 7:
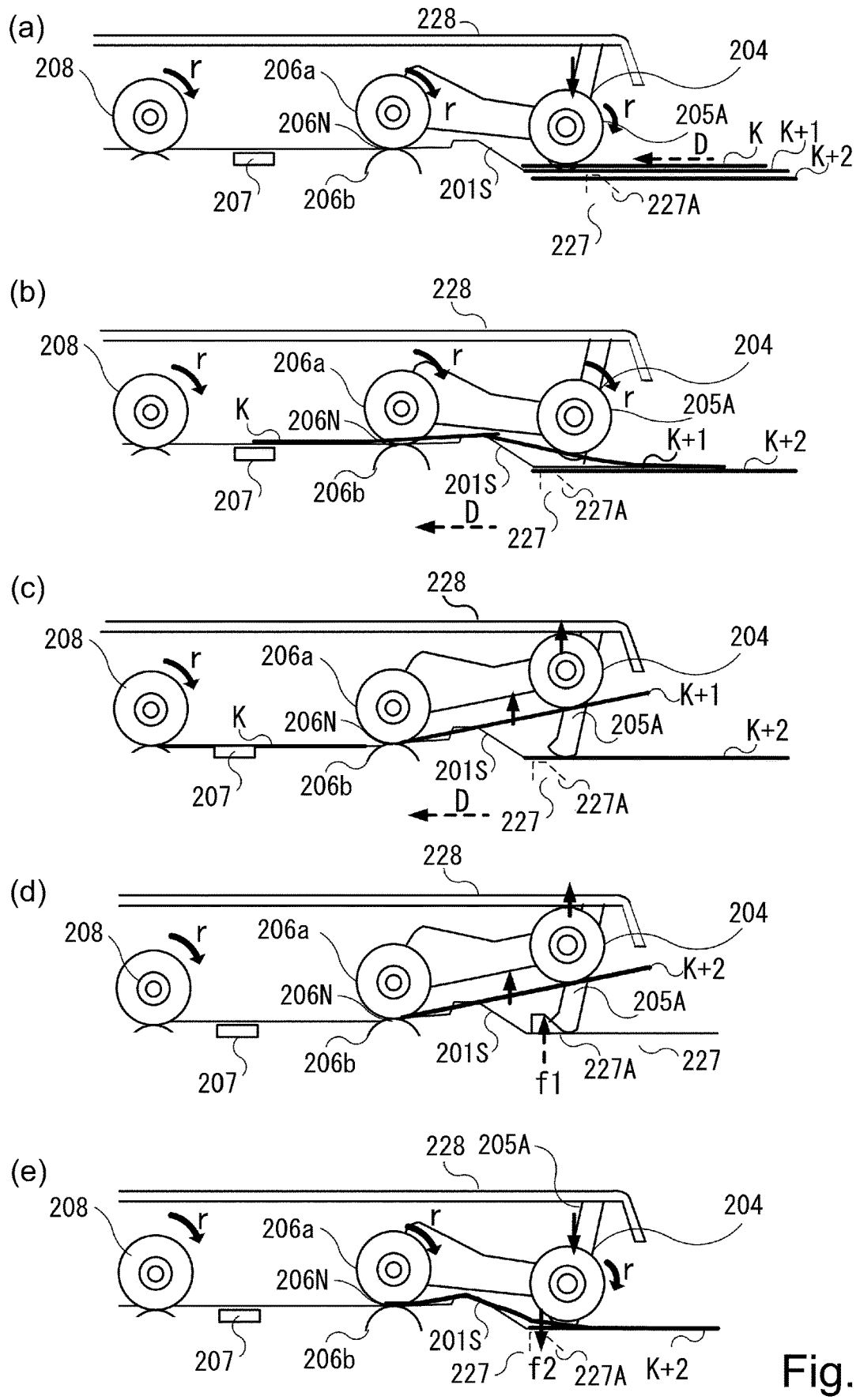

Parts (a) to (e) of FIG. 7 are a combination of sectional views of the essential portion of the AFD in the first embodiment, when a small document (sheet of paper) is being fed into, and conveyed through, the ADF; it shows the movement and reaction of the document (sheet), which occur as the small (document) sheet of paper is fed into, and conveyed through, the ADF.

Figure 8:
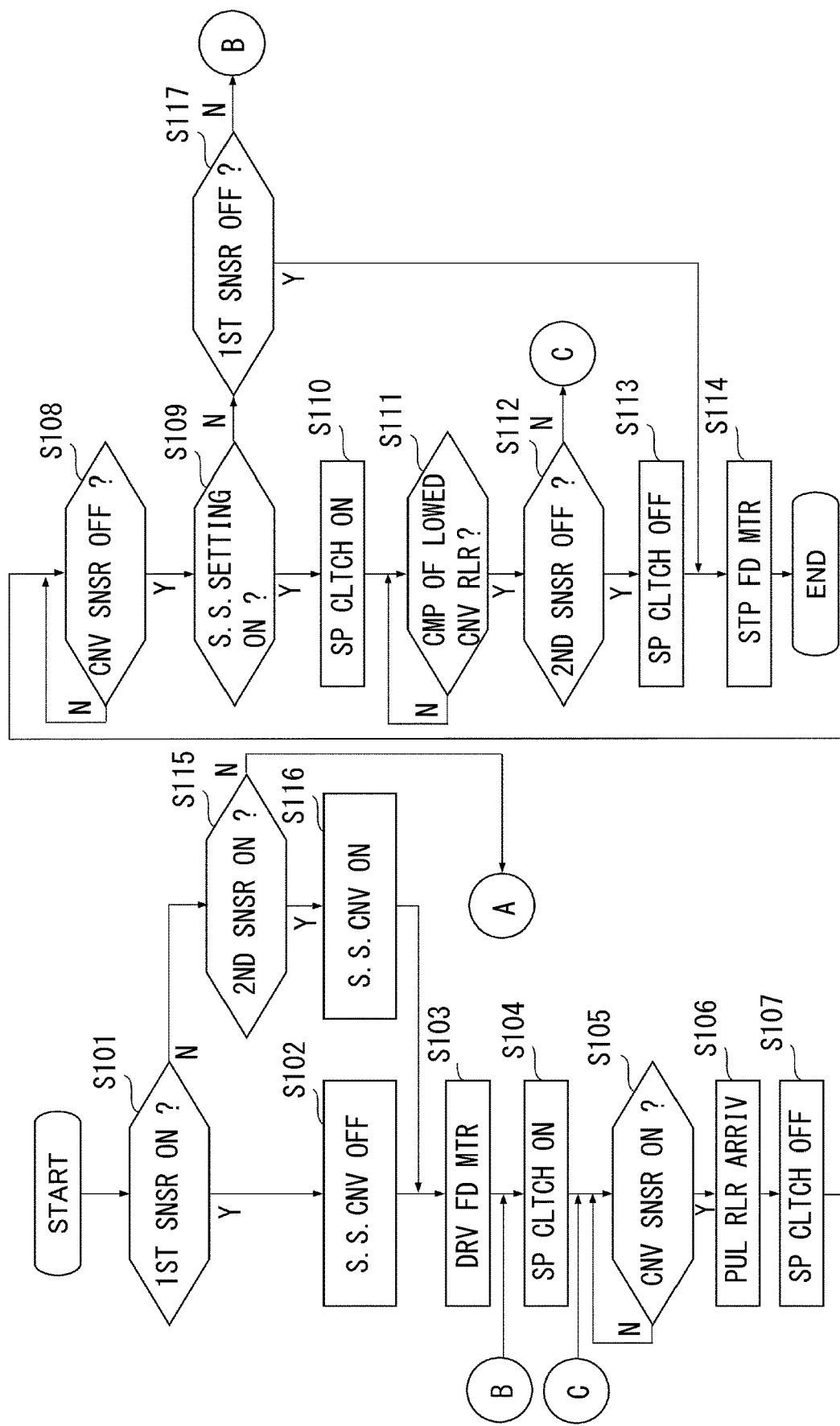

FIG. 8 is a flowchart of the document (sheet) feeding-conveying sequence of the ADF in the first embodiment.

Figure 9:
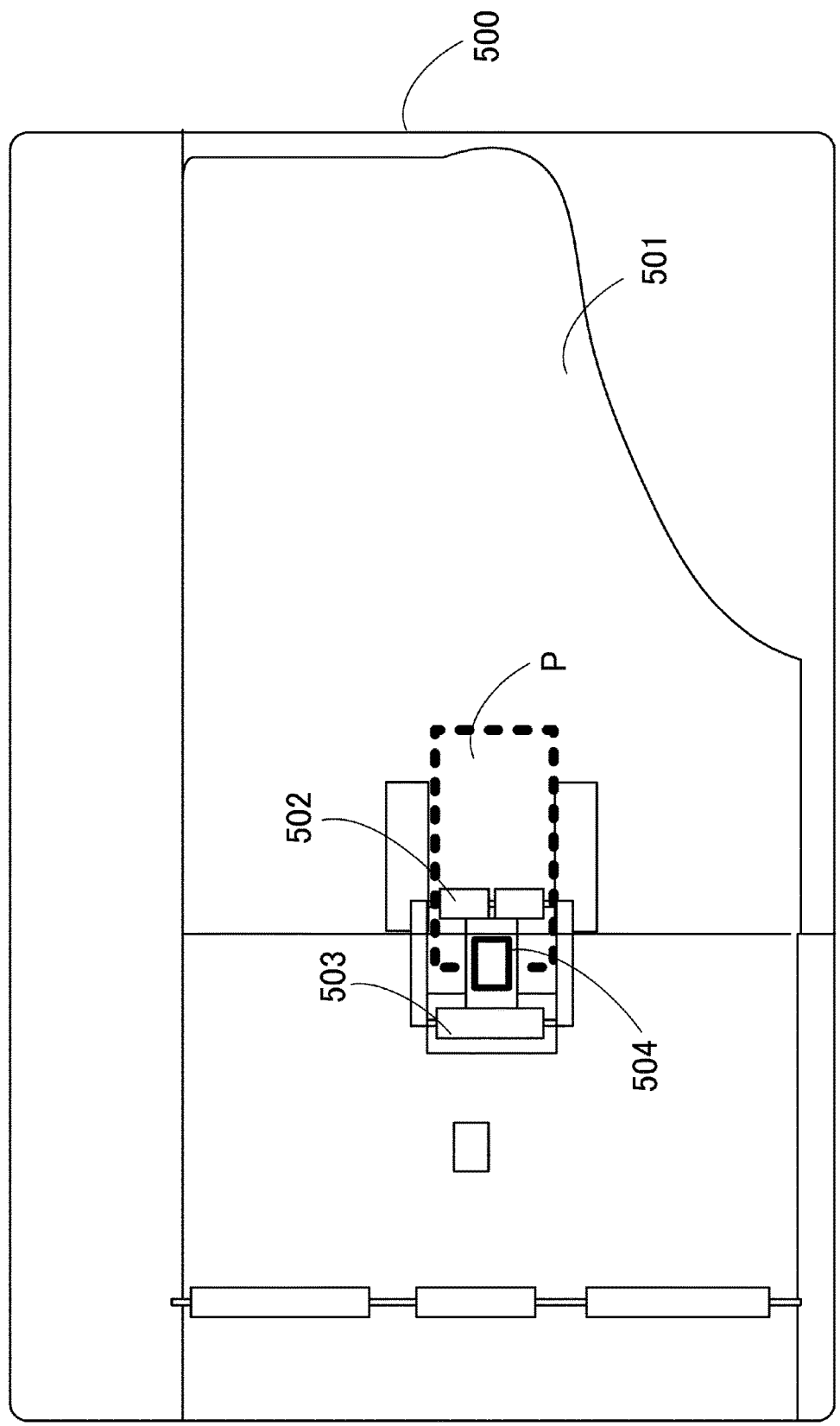

FIG. 9 is a top view of an example of referential ADF.

Figure 10:
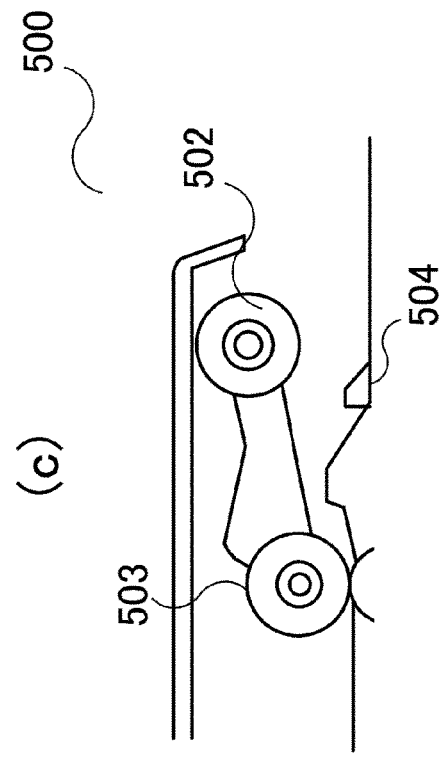
Figure 10:
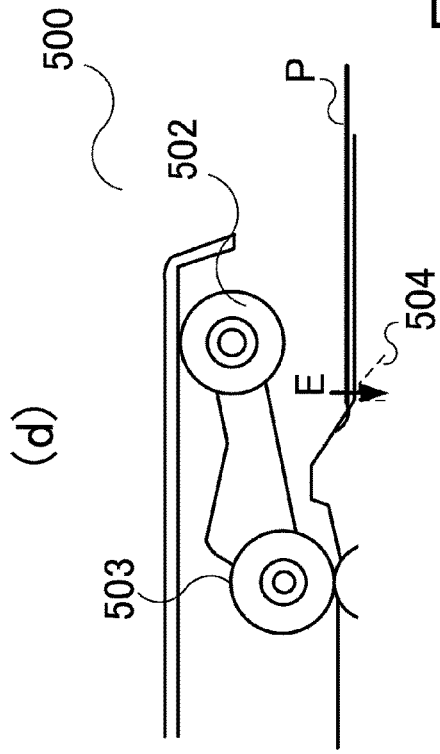
Figure 10:
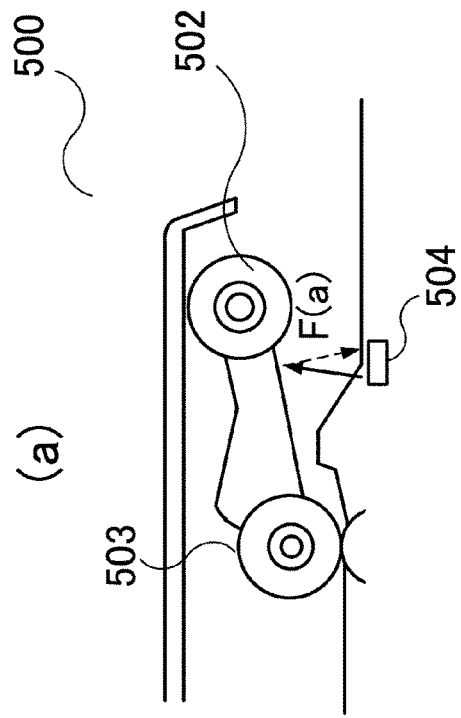
Figure 10:
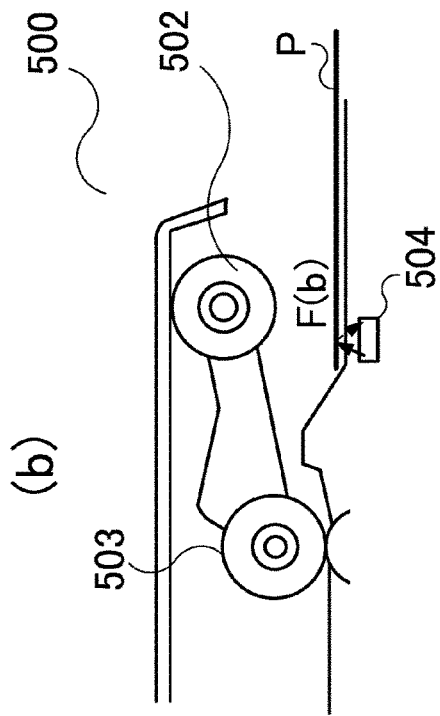

Parts (a) to (d) of FIG. 10 are a combination of sectional views of the example of referential ADF; it shows how a document is detected.

Figure 11:
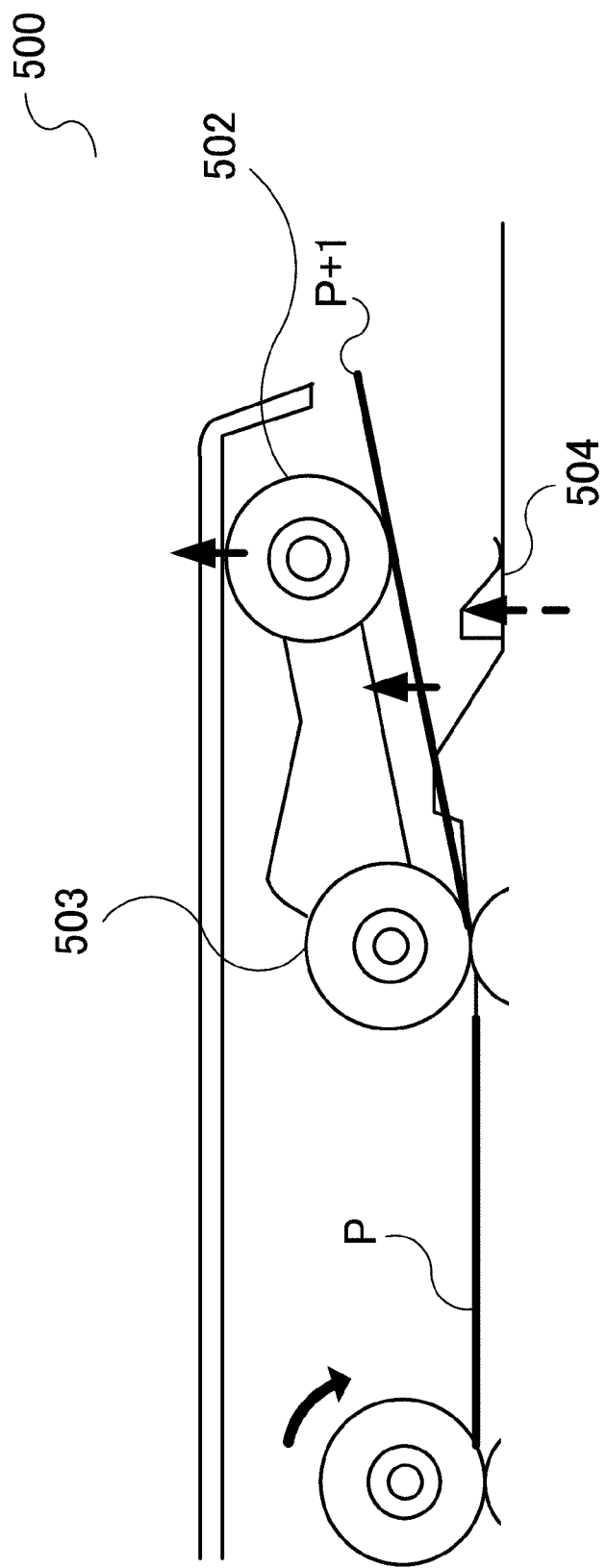

FIG. 11 is a sectional view of the essential portion of the example of referential ADF when the second document is not in contact with the tray (second document is floating).

DESCRIPTION OF THE EMBODIMENTS

Embodiment 1

<Structure of Image Forming Apparatus>

Figure 1:
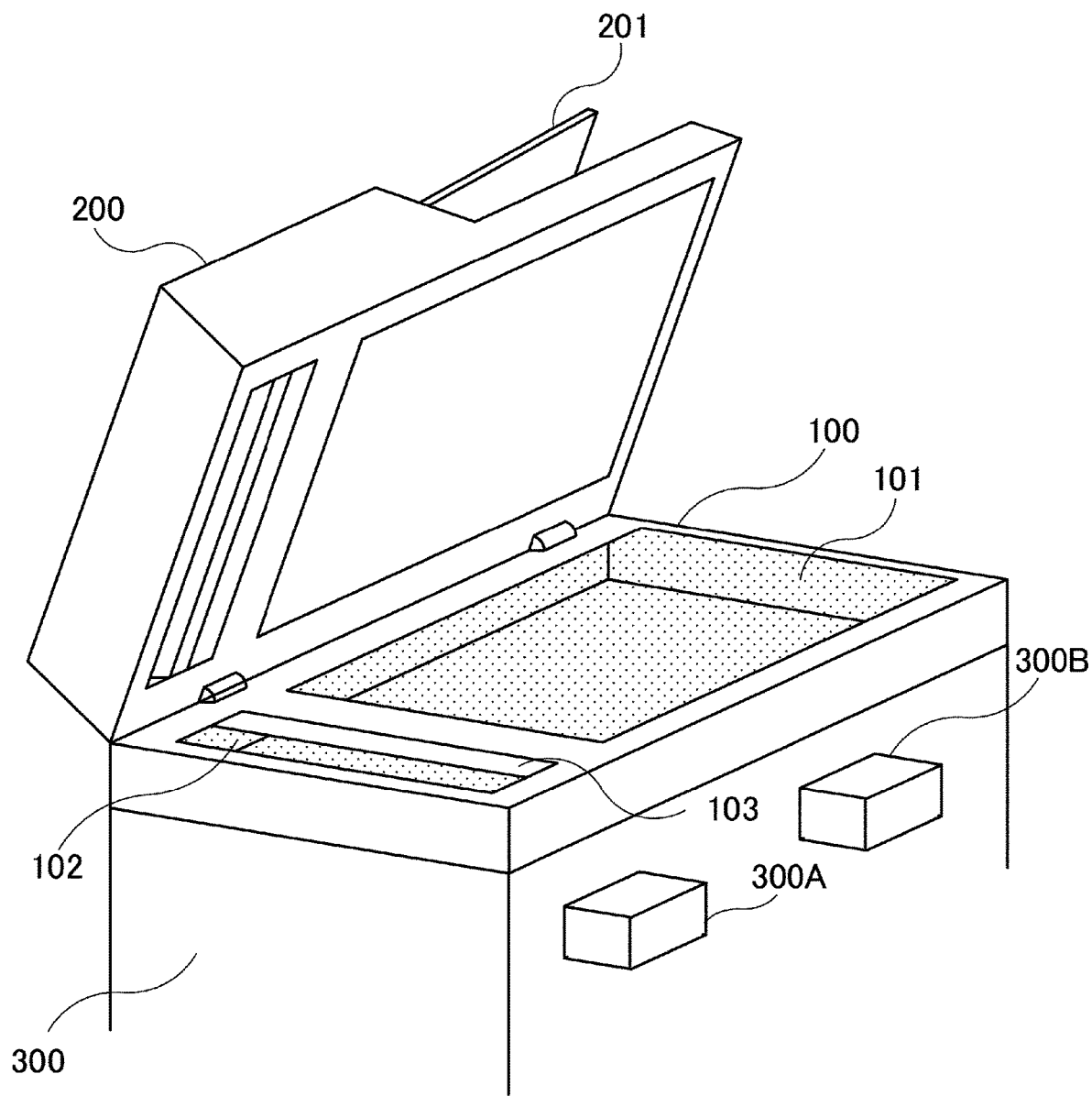
FIG. 1 is a perspective view of the image forming apparatus in the first embodiment of the present invention; it shows the general structure of the apparatus.

An automatic document reading apparatus 200 (which hereafter will be referred to as ADF 200), which is a document (sheet) feeding apparatus in this embodiment is described about its structure, with reference to appended drawings. FIG. 1 is a schematic sectional view of the image forming apparatus 300 in this embodiment. The ADF 200 feeds a document, which is in the form of a sheet of paper, into the reading portion of the image forming apparatus 100, conveys a document toward the image reading apparatus 100 (which hereafter will be referred to as reader 100), which reads a sheet, in the form of which a document is. Further, the ADF 200 is pivotally movable about a hinge, with which the top-rear edge of the reading unit 100 is provided, being enabled to be moved away from, or folded back upon, the reading unit 100. Further, the ADF 200 and reading unit 100 are on the top side of the image forming apparatus 300 which is for forming an image on a sheet of recording medium with the use of its image forming means 300B, which uses an electrophotographic or inkjet method. By the way, the structural design for the ADF 200 can be also applied to a manual document (sheet) feeding means, as a document (sheet) feeding apparatus, with which the image forming apparatus 300 is provided.

<Structure of Image Reading Apparatus>

Figure 2:
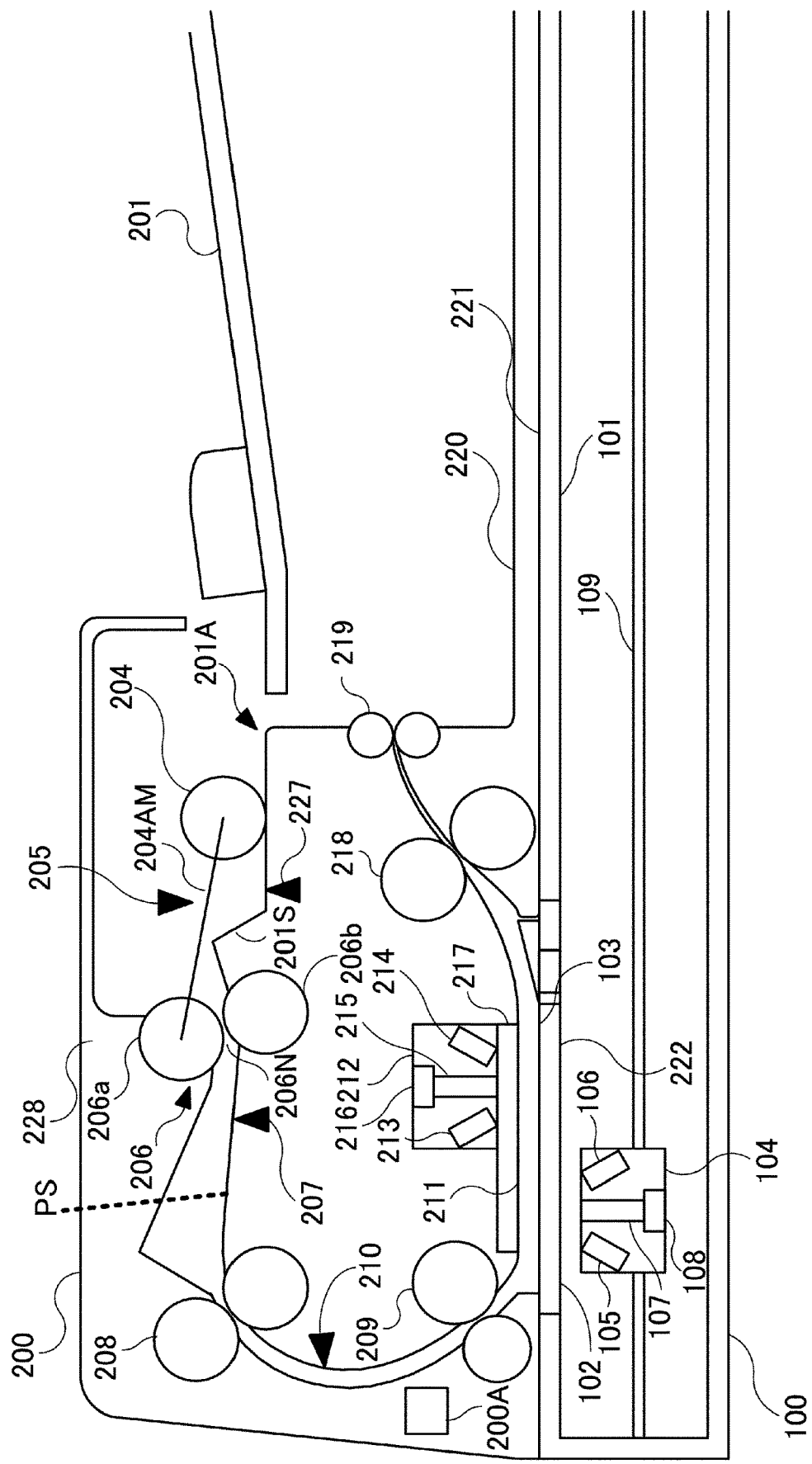
FIG. 2 is a sectional view of a combination of the reader and ADF in the first embodiment.

Next, referring to FIGS. 1 and 2, the ADF 200 and reading unit 100 are described about their structure. FIG. 2 is a sectional view of a combination of the ADF 200 and reading unit 100. They show the structure of the combination. The reader 100 has: a document placement glass platen 101, a top surface reading unit 104, an optical system motor 225 (FIG. 6), a document guide 109, and a white color referential member 103. The top surface reading unit 104 comprises a pair of top surface LEDs 105 and 106, a top surface lens array 107, and a top surface line sensor 108. The top surface reading unit 104 reads the image of a document (sheet of recording medium) on the document placement glass platen 101, line by line, while being moved along the pair of document guides 109. Referring to FIG. 2, a glass 102, through which the top surface of a document is read while the document is moved, is an integral part of the white color referential member 222. The top surface reading unit 104 reads the image of the document (in the form of sheet of paper) conveyed onto the aforementioned glass 102 by the ADF 200.

<Structure of Automatic Document Feeding Apparatus>

Next, referring to FIG. 2, the document (sheet) feeding operation of the ADF 200 is described. The ADF 200 has: a document tray 201 in which documents are placed in layers or on which documents are stacked; a separation roller pair 206; and a feed roller 204 contactable to and separable from the document tray 201. Further, in terms of a plane which coincides with the document placement surface 201A of the document tray 201, on which documents are placed in layers, there is a document guiding surface 201S, which guides a document toward the nip 206N of the separation roller pair 206, between the feed roller 204 and separation roller pair 206. The nip 206N of the separation roller pair 206 is positioned higher than the document placement surface 201A as seen from the direction parallel to the axis of the feed roller 204. Further, a cover portion 228 which is positioned in a manner to cover the top portion of the feed roller 204, is provided with an arm 204AM which supports the feed roller 204. The arm portion 204AM is positioned so that it does not come into contact with the document guiding surface 201A as the feed roller 204 are lowered.

The documents in the document tray 201 in which the documents to be read are placed in layers are prevented by a combination of the separation roller pair 206 and feed roller 204 from being released downstream of the document tray 201 before the feeding of documents is started. The separation roller pair 206, which is the separating-conveying means in this embodiment comprise a top separation roller 206a, as the first roller, which forms the nip 206N, as a separation nip, and a bottom separation roller 206b as the second roller. There are the first and second document sensors 205 and 206 for detecting the presence (or absence) of a document, between the separation roller pair 206 and feed roller 204. In this embodiment, the second document detecting means is the first document sensor 205, and the first document detecting means is the second document sensor 227. Also in this embodiment, before the feed roller 204 begins to be rotated to feed a document into the reading unit 100, the feed roller 204 is lowered to the top surface of the top one of the layered documents in the document tray 201. Then, the rotation of the feed roller 204 is started with the feed roller 204 remaining in contact with the top surface of the top document. As a result, the top most document alone or the top most document and document(s) below are fed into the reading unit 100. If the topmost document and documents below are fed together into the reading unit 100, the topmost document is separated from the rest by the separation roller pair 206, and then, is conveyed inward of the ADF 200.

After being conveyed toward the interior of the ADF 200 by the separation roller pair 206, the document reaches a puller roller pair 208. Further in terms of the document feeding direction, there is a document conveyance detection sensor 207 for detecting a document as the document is conveyed toward the puller roller pair 208, between the separation roller pair 206 and puller roller pair 208. Also in terms of the document feeding direction, there is a document passage which has a read upstream roller pair 209 for conveying a document toward the glass 102, through which a document is read as the document is conveyed across the glass 102, on the downstream side of the puller roller pair 208. As the document is conveyed to the document conveyance passage, the document is conveyed by the read upstream roller pair 209, to a top surface reading position, and then, to a bottom surface reading position, which is on the downstream side of the top surface reading position. The top surface reading position is where the top surface of the document is read by the top surface reading unit 104. The bottom surface reading position is where the bottom surface of the document is read by a bottom surface reading unit 212. In an operation for reading the top surface of a document, the document is conveyed through the glass 102 for reading the top surface of the document while the document is being conveyed, and the glass 217 for reading the bottom surface of the document while the document is conveyed. While the document is conveyed between the glasses 102 and 217, it is illuminated by a pair of top LEDs 105 and 106 while the document is moved on the underside of the top white color referential member 103 which is an integral part of the glass 102. The light emitted by the top LEDs 105 and 106 are reflected by the top surface of the document, the document is read line by line by the top light sensor 108 through a top lens array 107. That is, the image of the top surface of the document is read.

In an operation for reading both surfaces of a document, the top surface of the document is read by the top surface reading unit 104 as described above. As for the bottom surface of the document, it is read by the bottom surface reading unit 212 while the document is conveyed next to the bottom white color referential member 222 which is an integral part of the glass 102 for reading the top surface of a document while the document is conveyed. The bottom surface reading unit 212 comprises a pair of LEDs 213 and 214, and a lens array 215. It illuminates a document with the light from the LEDs 213 and 214. As a document is conveyed along the bottom white color referential member 222, the bottom reading unit 212 illuminates the document with the light from the bottom LEDs 213 and 214. The light reflected by the bottom surface of the document is read by the bottom line sensor 216 through the bottom lens array 215. That is, the bottom surface of the document is read by the bottom line sensor 216. After the reading of a document, the document is conveyed by the downstream roller pair 218 to a discharge roller pair 219, whereby it is discharged into a delivery tray 220. In a case where two or more documents are in the document tray 201, the above described sequence from the feeding of a document to discharging of the document is repeated until all documents are read and discharged into the delivery tray 220. By the way, in addition to the CIS such as the one shown in Figure, a CCD or the like compact optical system which comprises a lens array 107 and mirrors may be employed as the bottom surface reading unit 212.

At this time, an example of conventional ADF is described about it structural arrangement for detecting the presence (or absence) of a document (documents) in its document tray. FIG. 9 is a top view of the referential (conventional) ADF 500. As shown in FIG. 9, in the case of the ADF 500, its sensor 504 for detecting the presence (or absence) of a document P in the document tray 501 is positioned at the center of the document tray 501 in terms of the widthwise direction of the document tray 501, which is perpendicular to the direction in which a document is conveyed by a pickup roller 502. Since the sensor 504 is positioned as described above, even if a document such as a name cart (business card) or a post card which is narrower than an ordinary sheet of recording medium needs to be read, whether or not the document is in the document tray 501 can be detected by the sensor 504. In addition, in the case of the ADF 500, its pickup roller 502 and separating-conveying means 503 are supported by the top cover of the document tray 501. With the ADF 500 being structured as described above, the sensor 504 is likely to belong to the document tray 501.

For example, referring to FIGS. 10(a) and 10(b), in a case where a sensor of a reflective type such as a photo-reflector is employed as the sensor 504, the signal outputted by the sensor 504 will be ON or OFF depending on whether or not the sensor 504 received the light which was emitted by the sensor 504 and reflected by the document. Referring to FIG. 10(a), in a case where the sensor 504 is a photo-reflector, if there is no document in the document tray 501, the light emitted by the sensor 504 is reflected by the separating-conveying means 503. The amount by which the light from the sensor 504 is reflected by the separating-conveying means 503 (dashed arrow mark F(a)) is smaller than the amount by which the light is reflected by a document. Thus, the sensor 504 outputs an OFF signal. On the other hand, referring to FIG. 10(b), in a case where a document is in the document tray 501, the light emitted by the sensor 504 is reflected by the document in the document tray 501. The amount by which the light from the sensor 504 (arrow mark F(b) formed of broken line) is greater than the amount by which the light is reflected by the separating-conveying means 503. Thus, the sensor 504 outputs an ON signal. Further, referring to FIGS. 10(c) and 10(d), it sometimes occurs, from the standpoint of cost, that a sensor which comprises a flag which moves toward or away from the document placement surface of the document tray 501, is employed as the sensor 504. In such a case, as the flag is made to move toward the document placement surface of the document tray 501, by a document P as shown in FIG. 10(c), the sensor 504 output an ON signal. On the other hand, as the flag moves away from the document placement surface of the document tray 501, the sensor 504 outputs an OFF signal.

In a case where documents P and P+1 such as a name card (business card) and a post card, which are substantial in rigidity, and relatively short in terms of the direction in which they are conveyed, are consecutively fed into the ADF 500 structured as described above, it sometimes occurs that the document P+1 is lifted (made to float) away from the document placement surface of the document tray 501 as shown in FIG. 11. For example, if the document conveyance passage between the separating-conveying means 503 and pickup roller 502 is tilted, the document P+1 is lifted (made to float away) from the document placement surface of the document tray 501 by the document conveyance passage. Moreover, if the document P+1 happens to be in the form of a sheet of paper, as the document P+1 is lifted (made to float) away from the document placement surface of the document tray 501, the flag of the sensor 504 is allowed to move upward. Consequently, the sensor 504 erroneously determines that there is no document in the document tray 501 in spite of the presence of the document P+1, which is the next on to be fed, in the document tray 501. This is a problem.

Figure 3:
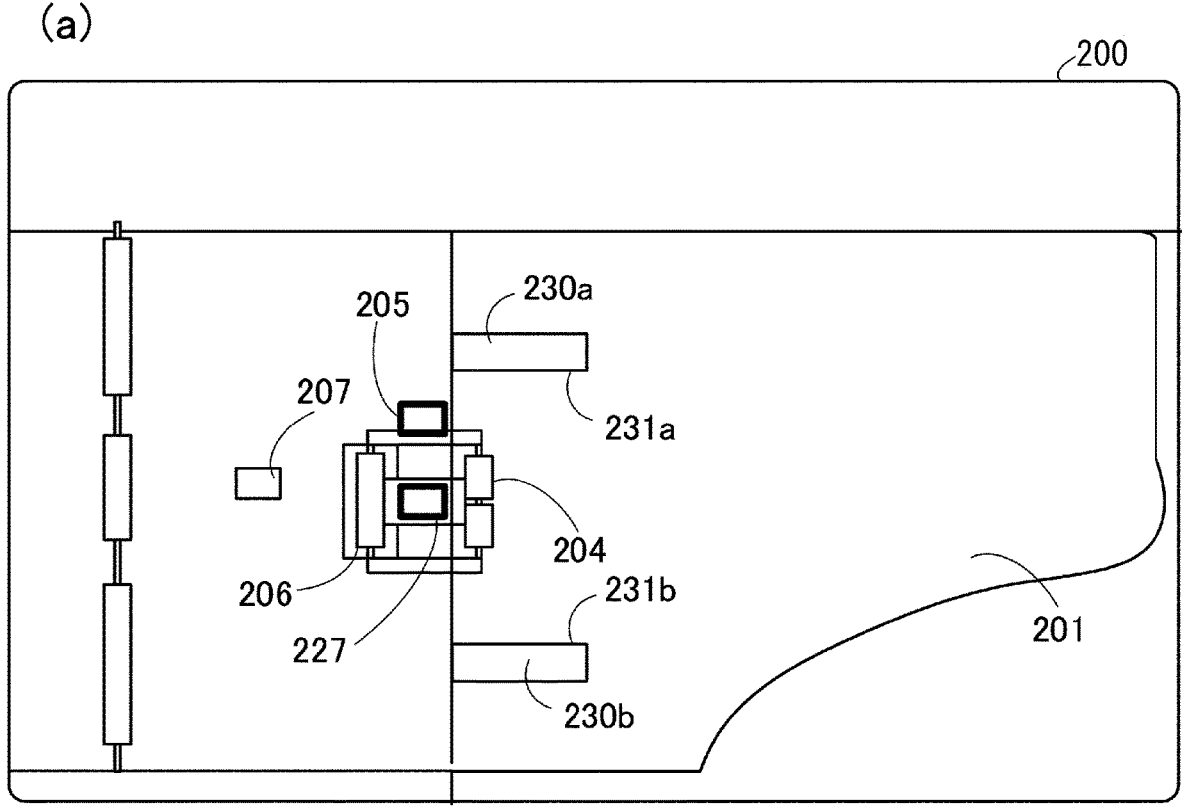
FIG. 3 is a combination of top and sectional views, respectively, of the essential portion of the ADF in the first embodiment.
Figure 3:
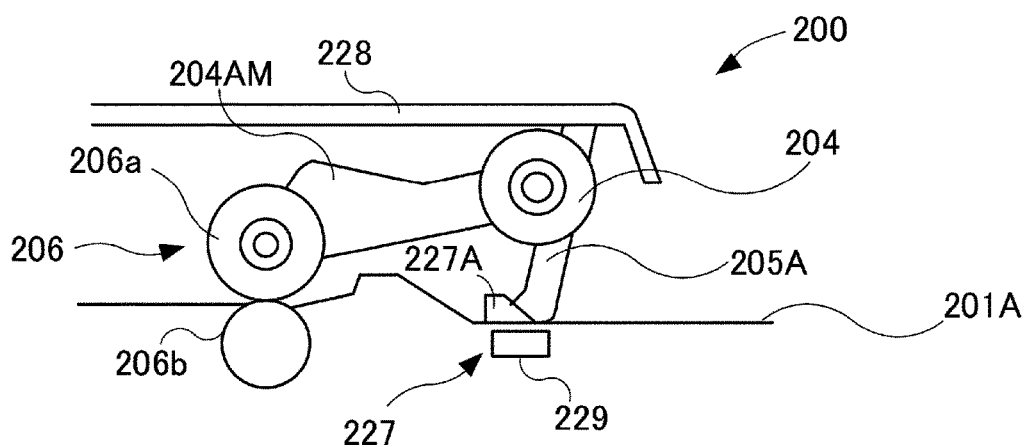

Next, referring to FIGS. 3 to 5, the ADF 200 in this embodiment is described about its structural arrangement for detecting a document in the document tray 201. FIG. 3(a) is a top view of the essential portion of the ADF 200 when there is no document in the document tray 201. In terms of the document conveyance direction, there are the first document sensor 205 as the second detecting means in this embodiment, and the second document sensor 227 as the first detecting means, between the separation roller pair 206 and feed roller 204. The detection position of the second document sensor 227, that is, the first detecting position in this embodiment, is at the center of the ADF 200 in terms of the direction which is perpendicular to the document conveyance direction. Further, the detection position of the first document sensor 205, which is the second detecting position in this embodiment, is offset in the widthwise direction of the document tray 201 (on the right side in terms of widthwise direction, as seen from upstream in terms of document conveyance direction). That is, in terms of the widthwise direction, the detecting position of the first document sensor 205 is on the outward side of the second document sensor 227, with reference to the center of the document tray 201 in terms of the widthwise direction. By the way, the ADF 200 may be structured so that the detecting position of the first document sensor 205 is on the other side of the detecting position of the second document sensor 227 from the one in this embodiment, in terms of the widthwise direction.

There are a pair of regulating members 230a and 230b, as document regulating means, on the document placement surface 201A. The regulating members 230a and 230b have regulating surfaces 231a and 231b, respectively, which regulate a document by the edges of the document in terms of the widthwise direction. The regulating members 230a and 230b are supported in such a manner that they are movable in the widthwise direction, on the document placement surface 201A. In terms of the widthwise direction, the feed roller 204 is positioned so that its position coincides with the center of a document which is being regulated by the regulating members 230a and 230b. The detecting position of the second document sensor 227 in the widthwise direction is disposed so as to overlap with the position of the feed roller 204 in the widthwise direction. That is, while a document is under the control of the regulating members 230a and 230b, it is where it is detectable by the second document sensor 227.

FIG. 3(b) is a sectional view of the essential portion of the ADF 200 when there is no document in the document tray 201. The first document sensor 205 is provided with a lever 205A, which is supported by the cover portion 228 in such a manner that it is pivotally movable. The lever 205A is positioned so that it hangs downward toward the document placement surface 201A from the cover portion 228. It pivotally moves in the document conveyance direction. A controller 200A (FIG. 2) can determine whether or not a document is at the detecting position of the first document sensor 205, based on the amount of the pivotal movement of the lever 205A. When a document is at the detecting position of the first document sensor 205, the lever 205A will have been moved by a preset amount, for example, 45 degrees, in the document conveyance direction, by the document, and therefore, will be blocking the light passage of an unshown photo-interrupter. The amount by which the lever 205A will have been pivotally moved by a document when the document is in the detecting position of the first document sensor 205 is the third amount in this embodiment. As the lever 205A is pivotally moved by 45 degrees into a position in which it blocks the light passage of the unshown interrupter, the first document sensor 205 outputs an ON signal. Thus, the controller 200A can determine that a document is at the detecting position of the first document sensor 205, based on the ON signal it received. On the other hand, when there is no document in the detecting position of the first document sensor 205, the lever 205A will have pivotally moved only 10 degrees, for example, in the document conveyance direction, and will have stopped without blocking the light passage of the photo-interrupter. The amount by which the lever 205A will have been pivotally moved when no document is at the detecting position of the first document sensor 205 is the fourth amount in this embodiment, which is smaller than the third one. As the lever 205A is pivotally moved by 10 degree, and therefore, the light passage of the unshown photo-interrupter is unblocked, the first document sensor 205 outputs an OFF signal. Thus, the controller 200A can determine that no document is at the detecting position of the first document sensor 205, based on the OFF signal it received.

The second document sensor 227 comprises a flag 227A, which is allowed to move in such a manner that as the flag 227A moves, it changes in the amount by which it protrudes from the document placement surface 201A, and a photo-interrupter 229, which is under the document placement surface 201A. The flag 227A is positioned so that it protrudes upward from the underside of the document placement surface 201A through a slit with which the document placement surface 201A is provided. It is vertically movable relative to the document placement surface 201A. As the flag 227A vertically moves relative to the document placement surface 201A, the light passage from the light emitting portion of the photo-interrupter 229 to the light catching portion of the photo-interrupter 229 is blocked or unblocked by the flag 227A. The controller 200A can determine whether or not a document is at the detecting position of the second document sensor 227, based on the amount by which the flag 227A protrudes. When a document is at the detecting position of the second document sensor 227, the flag 227A will have been pushed down into the position (5 mm, for example, downward from document placement surface 201A) in which it blocks the light passage. When the light passage of the photo-interrupter 229 is being blocked, the second document sensor 227 outputs an ON signal. Therefore, the controller 200A determines that a document is at the detecting position of the second document sensor 227, based on the ON signal it received. The amount by which the flag 227A is protrusive from the document placement surface 201A when the document is at the detecting position of the second document sensor 227 is the first amount in this embodiment. By the way, the first amount in this embodiment includes the amount by which the flag 227A is protrusive from the document placement surface 201A is zero, that is, when the flag 227A is not protrusive from the document placement surface 201A at all.

On the other hand, when no document is at the detecting position of the second document sensor 227 (FIG. 3(b)), the flag 227A is not being pushed downward by a document. Thus, the flag 227A is in a position (5 mm upward from document placement surface 201A, for example) in which it does not block the light passage of the photo-interrupter 229. The second document sensor 227 outputs an OFF signal when the light passage of the photo-interrupter 229 is remaining unblocked. Therefore, the controller 200A can determine, based on the OFF signal it received, that the no document is at the detecting position of the second document sensor 227. The amount by which flag 227A is protrusive from the document placement surface 201A when no document is at the detecting position of the second document sensor 227 is the second amount in this embodiment, which is greater than the first amount. Further, when the feed roller 204 moves downward toward the document tray 201, it moves in such a manner that its position relative to the flag 227A becomes such a position that the light passage of the photo-interrupter 229 remains unblocked by the flag 227A.

As described above, the ADF 200 can detect whether or not a document is at both the detecting positions of the first document sensor 205 and second document sensor 227 which are different in position in terms of the widthwise direction of a document. Thus, the controller 200A can determine whether or not a document is on the document placement surface 201A of the document tray 201, and also, the size of the document, base on the detection signals outputted from the first and second document sensors 205 and 227.

Next, the ADF 200 in this embodiment is described about its structural arrangement for determining the size of the document in the document tray 201. By the way, referring to FIGS. 4(a) and 5(a), the length W in terms of the widthwise direction is the length of the feed roller 204 in terms of the width wise direction. FIG. 4(a) is a top view of the ADF 200 when a document S, which is wider than the length W, is in the document tray 201. In this case, the presence of a document is detected at both the detecting positions of the first and second document sensors 205 and 227, and both the first and second document sensors 205 and 227 output an ON signal. Thus, the controller 200A determines that a document S, the width of which is greater than the length W is in the document tray 201.

FIG. 4(*b*) is a sectional view of the separation roller pair 206 and its adjacencies when a document S is in the document tray 201. In this case, if the lever 205A is in the position into which it moves by being pivotally moved by a preset amount by the document S, the first document sensor 205 outputs an ON signal, as described above. As the leading edge of the document S is moved into the area under the feed roller 204, the position of each of the edge portions of the document S, in terms of the widthwise direction, overlaps with the detecting position of the first document sensor 205. Thus, the lever 205A of the first document sensor 205 is pivotally moved downstream (indicated by arrow mark F1 in FIG. 4(*b*)) in terms of the document conveyance direction, by the document S. Consequently, the light passage of the unshown photo-interrupter is blocked. Thus, the first document sensor 205 outputs an ON signal. As for the second document sensor 227, its flag 227A is pushed down by the document S as described above. Therefore, as the flag 227A is moved into the position in which it blocks the light passage of the photo-interrupter 229, the second document sensor 227 outputs an ON signal. As the leading edge of the document S is pushed into the area under the feed roller 204, the flag 227A of the second document sensor 227 is moved downward relative to the document placement surface 201A. Consequently, the light passage of the photo-interrupter 229 is blocked by the flag 227A. Thus, the second document sensor 227 outputs an ON signal. As described above, since both the first and second document sensors 205 and 207 output an ON signal, the controller 200A determines that the width of the document S in the document tray 201 is greater than W.

FIG. 5(*a*) is a top view of the ADF 200 when a document, which is less in width than W, is in the document tray 201. In this embodiment, if a document K is no more than W in width, it will be referred to as a document of a "small size". When the document K is in the document tray 201, its position relative to the document tray 201 in terms of the widthwise direction remains regulated by the regulating members 230a and 230b in such a manner that in terms of the widthwise direction, the center of the document K coincides with the center of the feed roller 204. In this case, it is detected that the document K is at the detecting position of the second document sensor 227, but, the leading edge of the document K has not arrived at the detecting position of the first document sensor 205. Therefore, it is determined that there is no document at the detecting position of the first document sensor 205. That is, the first document sensor 205 outputs an OFF signal, and the second document sensor 227 outputs an ON signal. In a case where the first document sensor 205 outputs an OFF signal, and also the second document sensor 227 outputs an ON signal, the controller 200A determines that the document in the document tray 201 is no greater than W in width in terms of the widthwise direction; it determines that the document in the document tray 201 is a document K, which is a small document.

FIG. 5(*b*) is a sectional view of the separation roller pair 206 and its adjacencies when a document K is in the document tray 201. As described above, the first document sensor 205 outputs an ON signal as its lever 205A is pivotally moved by a preset amount by a document. More specifically, when the leading edge of the document K is in the area under the feed roller 204, into which the document K was pushed, the edge portion of the document K has not reached the detecting position of the first document sensor 205. That is, in terms of the widthwise direction, the edge portion of the document K is in such a position that does not overlaps with the detecting position of the first document sensor 205. Therefore, the lever 205A of the first document sensor 205 remains in such a state that it keeps the light passage of the unshown photo-interrupter open, and therefore, the first document sensor 205 outputs an OFF signal. On the other hand, as for the second document sensor 227, its flag 227A is pushed down by the document K as described above. Thus, as it is moved into a position in which it blocks the light passage of photo-interrupter 229, it outputs an ON signal. As the leading edge of the document K is pushed into the area under the feed roller 204, the flag 227A of the second document sensor 227 is moved downward of the document placement surface 201A by the document K. Therefore, the light passage of the photo-interrupter 229 is blocked by the flag 227A. Consequently, the second document sensor 227 outputs an ON signal. That is, in this case, the first document sensor 205 outputs an OFF signal, whereas the second document sensor 227 outputs an ON signal. Therefore, the controller 200A determines that a document K which is less in width than W is in the document tray 201. By the way, the width of a document K, as the second width of a document, is equal to the width of a narrowest document which can be regulated by the regulating members 230a and 230b, width of a document which is the same in width as a name card (business card), etc. Further, the width of a document which is W in width in terms of the widthwise direction, is greater than the width of the narrowest document which can be regulated by the regulating members 230a and 230b, or the width of a document of the name card size. That is, in this embodiment, the second width is narrower than the first width. That is, it is the width of a document, the edge of the document, in terms of the widthwise direction, which does not overlap with the detecting position of the first document sensor 205. Further, in this embodiment, the first width is equal to the width of a document, the edge of which in terms of the widthwise direction overlaps with the detecting position of the first document sensor 205.

<Control System>

Next, referring to FIG. 6, the structural arrangement for controlling the operation of the ADF 200 is described. FIG. 6 is a block diagram of a system for controlling the ADF 200 in operation. Referring to FIG. 6, the ADF 200 and image forming apparatus 300 are in electrical connection to each other by way of a pair of busses 401 and 402.

<Structure of ADF Controller>

To begin with, the system for controlling the reading unit 100 and ADF 200 in operation is described about its structure. The controller 200A, which is a means for controlling the reading unit 100 and ADF 200 in operation, has a CPU 301, a ROM 302, a RANI 303, an image transferring portion 304, an image memory 305, and an image processing portion 306. The CPU 301 is a computing means. It carries out the programs for controlling the reading unit 100 and ADF 200 in operation. The ROM 302 is a nonvolatile storage area, in which the programs for controlling the reading unit 100 and ADF 200 are stored. The RAM 303 is a storage area, which is used as the work area which the CPU 301 uses for computation. The CPU 301 downloads the programs in the ROM 302, opens the programs in the RAM 303, and carries out the programs to control the reading unit 100 and ADF 200 in operation.

The CPU 301 is in connection to a conveyance motor 224 for driving each of the rollers for conveying documents, in the ADF 200. The conveyance motor 224 is in connection to the feed roller 204 and separation roller pair 206 by way of a separation clutch 223. A document can be kept stationary in a position PS (FIG. 2), in which the document is yet to reach the puller roller pair 208, by the disconnection of the separation clutch 223. Further, the CPU 301 is in connection to the first document sensor 205, second document sensor 227, conveyance sensor 207, and read sensor 210. The conveyance sensor 207 and read sensor 210 are such sensors that detect the edges of the document, at the detecting positions in the ADF 200. The CPU 301 controls the conveyance motor 224 in driving pulse count. Driving pulse can be converted into the amount of distance by which a document is to be conveyed in the ADF 200. That is the CPU 301 controls the ADF 200 in sheet conveyance, based on the amount of distance it calculates from the driving pulse count for the conveyance motor 224.

Further, the CPU 301 is in connection to an optical system motor 225 for moving the top surface reading unit 104 in the secondary scan direction, an optical system HP sensor 226, the image memory 305, the image processing portion 306, and the image transferring portion 304. The top surface reading unit 104 and bottom surface reading unit 212 read the image of a document by scanning the document, line by line. The image memory 305 is a storage area for temporarily storing the data of the image of a document read by the top surface reading unit 104 and bottom surface reading unit 212. The image processing portion 306 processes the image data in the image memory 305. The image transferring portion 304 transfers the image data to the image transferring portion 314 of the controller 300A by way of the bus 402, after the processing of the image data by image processing portion 306.

<Structure of Controller on Main Assembly Side>

Next, the controller 300A of the image forming apparatus 300 is described about its structure. The controller 300A controls the image forming apparatus 300 in overall operation. The image forming apparatus 300 is an image forming system which includes the image reading apparatus 100. The controller 300A controls the image forming apparatus 300 in overall operation. The controller 300A is in connection to the controller 200A in such a manner that communication is possible between the two controllers. It controls the image forming apparatus 300 in operation, based on the signals from the controller 200A. Further, it outputs signals for controlling the reading unit 100 and ADF 200 in operation, to the controller 200A.

The controller 300A has the CPU 311, a ROM 312, a RAM 313, an image transferring portion 314, and an image memory 315. The CPU 311 is a computing means of the main assembly of the image forming apparatus 300. It carries out the programs for controlling the overall operation of the image forming apparatus 300. The ROM 312 is a nonvolatile storage area, in which the control programs for the image forming apparatus 300 are stored. The RAM 313 is a storage area, which is used as a work area for the computation by the CPU 311. As the CPU 311 reads the programs in the ROM 312, opens them, and carries out the opened programs, the operation of the image forming apparatus 300 is controlled by the controller 300A. An operation of the image forming apparatus 300 is the image forming operation by the image forming means 300B, for example. The image transferring portion 314 receives image data from the image transferring portion 304, and stores them in the image memory 315. By the way, the image forming apparatus 300 is provided with an operating portion 316 which is for a user to give operational commands to the image forming apparatus 300, reading unit 100, and ADF 200, and operational commands for displaying messages and images, to a user. The operating portion 316 is in communication with the CPU 311. It displays images, and also, outputs information related to the operational commands for the image forming apparatus 300, to the CPU 311.

The CPU 311 is in communication with the CPU 301 by way of the bus 401. It exchanges with the CPU 301, the control commands related to the image reading operations of the reading unit 100 and ADF 200, and controls data. For example, as the CPU 311 receives information related to a command to make the reading unit 100 and ADF 200 start an image reading operation, through the operating portion 316, it outputs to the CPU 301, information which demands the starting of an image reading operation. More concretely, as the CPU 311 receives from a user, information regarding the size of a document by way of the operating portion 316, it transmits to the CPU 301, information regarding the size of the document (dimension of document in terms of widthwise direction and document conveyance direction). Further, as the CPU 311 receives from the CPU 301, information which indicates an occurrence of anomaly in the reading unit 100 and/or ADF 200, it makes the operating portion 316 display to a user, such a message that is appropriate for the type of anomaly.

Next, what occur to a document K, that is, a document of a small size, if it is fed into the image reading apparatus 100 in this embodiment is described. FIGS. 7(a)-7(d) are enlarged sectional views of the feed roller 204 and separation roller pair 206, and their adjacencies. They show what occurs to the document K as the document K is fed into the ADF 200. Referring to FIG. 7(a), as the separation clutch 223 is engaged, the feed roller 204 is connected to the conveyance motor 224, and therefore, rotates in the direction indicated by an arrow mark r by being driven by the conveyance motor 224. Further, it moves downward into the document tray 201, picks up the topmost document of the multiple layered documents in the document tray 201, and conveys the document K in the direction indicated by an arrow mark D drawn with a dotted line.

Referring to FIG. 7(b), as the leading edge of the document K is moved through the nip of the separation roller pair 206, and reaches the puller roller pair 208, the CPU 311 disengages the separation clutch 223 to stop the rotation of the feed roller 204. This process is for preventing the problem that the document K+1, which is to be fed next, is fed into the ADF 200 immediately after the document K is moved through the nip of the feed roller 204. However, in a case where multiple documents to be read are of a small size, the trailing edge of the document K is moved past the feed roller 204, before the leading edge of the document K reaches the puller roller pair 208 and stops the rotation of the pickup roller. Thus, the feed roller 204 comes into contact with the document K+1 while remaining rotating. Consequently, the document K+1 is conveyed in the direction indicated by the dashed line arrow mark D, along with the document K, as shown in FIG. 7(b). That is, the so-called "tagging" occurs. The occurrence of this phenomenon is not limited to a case where documents to be fed into an automatic document feeder are shorter than a certain value. For example, it possibly occurs in a case where the documents to be fed into an automatic document feeder are small in friction, and/or the preceding document and following document are remaining stuck to each other due to static electricity.

Referring to FIG. 7(c), if the document K+1 is fed into the ADF 200 along with the document K, the document K+1 is made to upwardly separate (float) from the document tray 201. Then, as the leading edge of the document K, which is to be fed into the document passage, reaches the puller roller pair 208, the rotation of the front cover 20 stops. As the document K reaches the puller roller pair 208, it is conveyed by the puller roller pair 208, and the rollers which are on the downstream side of the document passage. Further, the rotation of the feed roller 204 and separation roller pair 206 is under the control of the separation clutch 223. Moreover, there is a guiding surface 201S between the feed roller 204 and separation roller pair 206. The guiding surface 201S is a part of the document placement surface 201A of the document tray 201. It guides a document toward the nip 206N of the separation roller pair 206 by the leading edge of the document. Further, the nip 206N of the separation roller pair 206 is higher in position than the document placement surface 201A. Therefore, it is prevented that all the documents in the document tray 201 move downstream in terms of the document conveyance direction. Therefore, it is assured that only the topmost document is fed into the document conveyance passage. If the topmost document and the second document are fed into the ADF 200 in such a manner that the second one tags along the topmost one, it sometimes occurs that as the leading edge portion of the topmost one enters the nip 206N of the separation roller pair 206, the second one, or the one which is tagging along the topmost one, floats away from the document placement surface 201A of the document tray 201. In this embodiment, the phenomenon that as the leading edge of a document reaches the separation roller pair 206, the trailing edge portion of the document floats away from the document placement surface 201A of the document tray 201 is referred to as "document floatation". During the "document floatation", the separation clutch 223 remains disengaged, and therefore, neither the feed roller 204 nor separation roller pair 206 is rotating. Thus, the feed roller 204 does not have a power to move itself downward. That is, during the "document floatation", the feed roller 204 remains separated from the document placement surface 201A.

FIG. 7(d) shows the state of the essential portion of the ADF 200, in which the document K+2 has begun to be fed along (tag along) with the document K+1 while the document K+1 had begun to be fed along (tag along) with the document K. As the document K+2, which is the last (bottommost document) in the document tray 201, begins to be fed along with the document K+1, the leading edge of the document K+2 reaches the separation roller pair 206. Then, as the trailing edge of the document K+1 passes by the feed roller 204, the document K+2, that is, the next document begins to be fed. At this point in time, it is determined whether or not a document is on the document placement surface 201A of the document tray 201, based on the output of the second document sensor 227, before the feed roller 204 is lowered to start feeding the next documents. The first detection in this embodiment is the process to detect the presence or absence of a document on the document placement surface 201A of the document tray 201. Further, the first mode in this embodiment is the operational mode in which whether or not a document is present at the detecting position of the second document sensor 227 on the document tray 201 before the lowering of the feed roller 204.

In this case, however, the document K+2 is floating, and therefore, the flag 227A of the second document sensor 227 will have moved in the direction indicated by the dashed line arrow mark f1 in FIG. 7(d). Consequently, it is determined that no document is present at the detecting position of the second document sensor 227. As described above, as the "tag-along" occurs, it is determined that no document is in the document tray 201 even though a document (documents) to be conveyed is in the document tray 201. Therefore, it is possible that the document K+2 will remains unfed in the document tray 201.

In comparison, in this embodiment, the feed roller 204 is lowered as shown in FIG. 7(e). Then, it is determined, based on the result of the document detection by the second document sensor 227, whether or not a document is on the document placement surface 201A of the document tray 201. More concretely, first, the separation clutch 223 is engaged to lower the feed roller 204 until the feed roller 204 presses on the document K+2. Therefore, the document K+2 is pushed down by the feed roller 204, causing the flag 227A of the second document sensor 227 to move downward (indicated by arrow mark f2) toward the document placement surface 201A. Consequently, the document K+2 is placed on the document placement surface 201A; the problem of "document floatation" is solved. Then, it is determined, based on the result of the document detection by the second document sensor 227, whether or not the document K+2 is on the document placement surface 201A of the document tray 201. This process of detecting the presence (or absence) of a document on the document placement surface 201A of the document tray 201 after the lowering of the feed roller 204 is the document detecting process in accordance with the present invention. Further, the second mode, in this embodiment, in which the presence (or absence) of a document at the detecting position of the second document sensor 227 on the document tray 201 is determined after the lowering of the feed roller 204 is the document conveyance mode for a small document, which is in accordance with the present invention. By the way, the ADF 200 may be structured so that in the small document conveyance mode, the second detection process is carried out after the first detection process.

As described above, in a case where a document is on the document placement surface 201A of the document tray 201 in the small document conveyance mode, the second document sensor 227 is made to output an ON signal by the movement of the flag 227A which is caused by the lowering of the feed roller 204. On the other hand, in a case where the ADF 200 is in the small document conveyance mode, and no document is in the document tray 201, the lowering of the feed roller 204 does not cause the flag 227A to move. Therefore, the second document sensor 227 continues to output an OFF signal. As described above, in this embodiment, whether or not a document is on the document placement surface 201A of the document tray 201 is detected after the placement of the "floating document" back on the document placement surface 201A. Therefore, this embodiment can substantially reduce the ADF 200 in the probability with which the presence (or absence) of a document on the document placement surface 201A of the document tray 201 is erroneously determined.

<Document Feeding Sequence>

Next, referring to FIG. 8, the operational sequence through which documents are fed into the ADF 200 in this embodiment, from its document tray 201, is described. FIG. 8 is a flowchart of the operational sequence through which the documents in the document tray 201 of the ADF 200 in this embodiment are fed into the main assembly of the document reading apparatus 200. The document feeding operation diagramed in the form of the flowchart in FIG. 8 is an operation which is carried out primarily by the controller 200A; the programs stored in the ROM 302 are carried out by the CPU 301. By the way, the flowchart in FIG. 8 is applicable to both the operation for feeding a document to read only the image on one of the two surfaces of the document, and also, to read the images on both surfaces, one for one, of the document.

As a command to make the image reading apparatus 100 start reading the image of a document is inputted by a user with the use of the operating portion 316, a signal to start the reading is outputted to the controller 300A from the CPU 311 of the controller 300A. As a result, the abovementioned sequence is started. As the signal to start the reading is inputted into the controller 200A, the signal from the first document sensor 205 is confirmed (S101). If the signal outputted from the first document sensor 205 is an ON signal (S101/Y), it is determined that the documents in the document tray 201 are not small, and the information for turning off the small document conveyance mode is stored in the RAM 303 (S102). On the other hand, if the signal outputted by the first document sensor 205 is an OFF signal (S101/N), and the signal outputted by the second document sensor 227 is an ON signal (S115/Y), it is determined that the documents in the document tray 201 are documents of a small size. Then, the information for turning on the small document conveyance mode is stored in the RAM 303 (S116).

Next, the conveyance motor 224 is driven to feed the documents from the document tray 201 (S103), and the separation clutch 223 is engaged (S104). Thus, the feed roller 204 moves down onto the topmost document in the document tray 201, and rotates while remaining in contact with the top surface of the topmost document. Therefore, the topmost document is sent to the separation roller pair 206 by itself, or with the documents below the topmost one. Then, the document is conveyed toward the puller roller pair 208. If two or more documents are sent to the separation roller pair 206, the topmost one is separated from those under the topmost one, and sent to the puller roller pair 208. If the conveyance sensor 207 outputs an ON signal (S105/Y), it is determined that a document has arrived at the puller roller pair 208 (S106). As a document arrives at the puller roller pair 208, the separation clutch 223 is disengaged (S107) to stop the rotation of the feed roller 204 and separation roller pair 206. As a document reaches the puller roller pair 208, it is conveyed toward the top surface reading position, in which the image of the top surface of a document is read by the top surface reading unit 104. By the way, in the case where both the image of the top surface of a document and the image of the bottom surface of the same document need to be read, the image of the bottom surface of the document is read by the bottom surface reading unit 212 after the reading of the image of the top surface of the document. As the signal outputted by the conveyance sensor 207 is made to change from an ON signal to an OFF signal by the conveyance of a document by the puller roller pair 208 (S108/Y), it is determined with reference to the RAM 303 whether or not the ADF 200 is in the small document conveyance mode (S109).

It is known that in a case where the ADF 200 is in the small document conveyance mode (S109/Y), the documents in the document tray 201 are of a small size. Thus, the feed roller 204 is lowered (S111) by the engagement of the separation clutch 223, before the detection of the presence (or absence) of the documents in the document tray 201. During this process, the documents in the document tray 201 are pushed down toward the document placement surface 201A of the document tray 201 by the descending of the feed roller 204 toward the document placement surface 201A of the document tray 201. As described above, in a case where the small document conveyance mode is ON, the feed roller 204 is lowered to push the documents in the document tray 201 down toward the document placement surface 201A of the document tray 201, before the detection of the presence (or absence) of a document by the second document sensor 227. Therefore, the problematic floating of a document will have been resolved before the detection of the presence (or absence) of a document in the document tray 201 by the second document sensor 227. In other words, even if the flag 227A of the second document sensor 227 is protruding upward beyond the document placement surface 201A because of the floating of the document, the floating document is pushed down onto the document placement surface 201A, and therefore, the flag 227A of the second document sensor 227 is moved below the document placement surface 201A by the document. Therefore, the output of the second document sensor 227 changes from an OFF signal to an ON signal. By the way, in S111, the feed roller 204 is lowered to the same position as the one for feeding a document.

After the completion of the lowering of the feed roller 204 (S111/Y), the output signal from the second document sensor 227 is confirmed (S112). If the output signal from the second document sensor 227 is an ON signal (S112/N), there is a document in the document tray 201. Therefore, the controller 200A returns to S105, and repeats the steps S105 to S111 until there will be no document in the document tray 201. As described above, in this embodiment, if it is detected that the documents in the document tray 201 are of a small size, whether or not a document is in the document tray 201 is determined after the lowering of the feed roller 204. By the way, if the signal outputted from the second document sensor 227 is an OFF signal (S112/Y), there is no document in the document tray 201. Thus, the conveyance motor 224 is stopped (S114) by the disengagement of the separation clutch 223 (S113) to end the document feeding operational sequence.

On the other hand, it is known that in a case where the small document conveyance mode is OFF (S109/N), the documents in the document tray 201 are not of a small size. In such a case, it is determined that the document in the document tray 201 is not floating. Then, the output signal of the first document sensor 205 is confirmed before the controller 200A begins to lower the feed roller 204 (S117). In a case where the output signal from the first document sensor 205 is not an ON signal (S117/N), at least one document is on the document placement surface 201A of the document tray 201. Therefore, the controller 200A returns to S104, and repeats steps S104 to S109 until there will be no document in the document tray 201. As described above, in this embodiment, if it is detected that the documents in the document tray 201 are not of a small size, whether or not at least one document is in the document tray 201 is determined after the feed roller 204 is lowered. On the other hand, in a case where the output signal from the first document sensor 205 is an OFF signal (S11/Y), there is no document in the document tray 201. Therefore, the conveyance motor 224 is stopped (S114) to end the document feeding operational sequence. By the way, after the starting of a document reading process, if both the output signal from the first document sensor 205 and that from the second document sensor 227 are OFF signals (S101/N and S115/N), the image of a document is read while the document is kept on the document placement glass platen 101. Then, the image reading sequence is ended after the completion of the reading of this document (FIG. 8, A).

As described above, in this embodiment, in a case where the documents in the document tray 201 are likely to float, the feed roller 204 is lowered to press the document in the document tray 201 against the document placement surface 201A of the document tray 201, before whether or not there is a document in the document tray 201 is determined. Therefore, the ADF 200 in this embodiment is substantially lower in the probability with which whether or not a document is in the document tray 201 is erroneously determined due to the "document floatation".

<Miscellanies>

In the first embodiment, the ADF 200 is structured so that the presence (or absence) of documents in the document tray 201 was detected based on whether or not the light passage of the photo-interrupter 229 is blocked by the flag 227A of the second document sensor 227. However, such a sensor as a photo-reflector, which detects the presence (or absence) of a document by projecting a beam of light toward the document passage, and measuring the amount by which the beam of light is reflected, may be employed in place of the second document sensor 227. Even if a photo-reflector is employed in the place of the second document sensor 227, it is possible to substantially reduce the ADF 200 in the probability with which the presence (or absence) of a document is erroneously detected due to the "document floatation".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-004637 filed on Jan. 15, 2020, which is hereby incorporated by reference herein in its entirety.

What is claimed is:

1. A sheet feeding apparatus comprising:
 a sheet tray provided with a sheet placement surface on which a sheet is to be placed;
 a feed roller contactable to and separable from a top surface of the sheet placed on the sheet tray, the feed roller being configured to feed the sheet in a feeding direction by rotating in contact with the top surface of the sheet;
 a separation conveying unit disposed downstream of the feed roller with respect to the feeding direction, the separation conveying unit being configured to separate and convey sheets fed from the feed roller, one by one;
 a detecting unit provided with a flag member that is movable so as to change a protrusion amount by which the flag member protrudes from the sheet placement surface at a detecting position of the sheet placement surface, the detecting unit being configured to detect the sheet placed on the sheet tray based on the protrusion amount of the flag member; and
 a control unit configured to determine the presence or absence of the sheet at the detecting position based on the detecting unit,
 wherein after feeding a first sheet by the feed roller and starting to lower the feed roller, the control unit determines the presence or absence of a second sheet following the first sheet at the detecting position.

2. A sheet feeding apparatus according to claim 1, wherein the control unit executes an operation (i) in a first mode in which the control unit determines the presence or absence of the second sheet at the detecting position after feeding the first sheet by the feed roller and before starting to lower the feed roller, and (ii) in a second mode in which the control unit determines the presence or absence of the second sheet at the detecting position after feeding the first sheet by the feed roller and after starting to lower the feed roller.

3. A sheet feeding apparatus according to claim 2, wherein the detecting unit is a first detecting unit and the detecting position is a first detecting position,
 wherein the sheet feeding apparatus further comprises a second detecting unit configured to detect the presence or absence of the sheet at a second detecting position different from the first detecting position, and
 wherein, in a case in which the first detecting unit and the second detecting unit detect the sheet, the control unit determines the presence or absence of the sheet by the operation in the first mode.

4. A sheet feeding apparatus according to claim 3, wherein the second detecting position is disposed on the outward side of the first detecting position with respect to a widthwise direction that is perpendicular to the feeding direction.

5. A sheet feeding apparatus according to claim 3, further comprising:
 a cover portion configured to cover a top portion of the feed roller,
 wherein the second detecting unit includes a lever portion supported by the cover and pivotally movable in the feeding direction and detects that the sheet is at the second detecting position based on the pivotal movement of the lever portion.

6. A sheet feeding apparatus according to claim 2, wherein the control unit executes the operation in the first mode in a case in which the sheet, of which width is a first width, is placed on the sheet placement surface and executes the operation in the second mode in a case in which the sheet, of which width is a second width less than the first width, is placed on the sheet placement surface.

7. A sheet feeding apparatus according to claim 1, wherein the separation conveying unit includes a first roller and a second roller, and the separation conveying unit separates the sheets fed from the feed roller, one by one, in a separation nip formed by the first roller and the second roller.

8. A sheet feeding apparatus according to claim 6, further comprising:
 an arm portion configured to support the feed roller,
 wherein the sheet tray includes a guide surface that is inclined from the sheet placement surface toward the separation conveying unit, and the guide surface guides the sheet toward the separation nip by a leading edge of the sheet, and
 wherein the guide surface is disposed so as not to contact the arm portion when the feed roller is lowered.

9. A document sheet feeding apparatus according to claim 1, further comprising:
 a sheet regulating unit provided with a pair of regulating surfaces regulating the sheet by edges of the sheet with respect to a widthwise direction that is perpendicular to the feeding direction and movably supported in the widthwise direction on the sheet placement surface,
 wherein the feed roller is disposed at the center of the sheet regulated by the sheet regulating unit with respect to the widthwise direction.

10. An image reading apparatus comprising:
 a sheet feeding apparatus according to claim 1;
 an image reading unit configured to read the sheet fed from the sheet feeding apparatus.

11. An image forming apparatus comprising:
 an image reading apparatus according to claim 10;

an image forming unit configured to form an image on a sheet based on an image read by the image reading apparatus.

\* \* \* \* \*